US011846730B2

(12) United States Patent
Slobodyanyuk et al.

(10) Patent No.: US 11,846,730 B2
(45) Date of Patent: *Dec. 19, 2023

(54) IMPLEMENTATION OF THE FOCAL PLANE 2D APD ARRAY FOR HYPERION LIDAR SYSTEM

(71) Applicant: QUALCOMM Incorporated, San Diego, CA (US)

(72) Inventors: Volodimir Slobodyanyuk, San Diego, CA (US); Karim Arabi, San Diego, CA (US); Evgeni Gousev, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

This patent is subject to a terminal disclaimer.

(21) Appl. No.: 16/557,537

(22) Filed: Aug. 30, 2019

(65) Prior Publication Data

US 2020/0011975 A1 Jan. 9, 2020

Related U.S. Application Data

(63) Continuation of application No. 15/266,618, filed on Sep. 15, 2016, now Pat. No. 10,408,926.

(Continued)

(51) Int. Cl.
G01S 7/4863 (2020.01)
G01S 7/481 (2006.01)
G01S 1/42 (2006.01)
G02B 26/10 (2006.01)
G01S 17/14 (2020.01)
(Continued)

(52) U.S. Cl.
CPC .......... *G01S 7/4863* (2013.01); *G01S 7/4816* (2013.01); *G01S 7/4817* (2013.01); *G01S 7/4818* (2013.01); *G01S 17/06* (2013.01); *G01S 17/14* (2020.01); *G01S 17/42* (2013.01); *G02B 26/103* (2013.01)

(58) Field of Classification Search
CPC ........ G01S 17/93; G01S 17/06; G01S 7/4863; G01S 17/14; G01S 7/4816; G01S 7/4817; G01S 7/4818; G01S 17/42; G02B 26/103
See application file for complete search history.

(56) References Cited

U.S. PATENT DOCUMENTS 5,157,257 A 10/1992 Geiger
5,317,148 A 5/1994 Gray et al.
(Continued)

FOREIGN PATENT DOCUMENTS

CN 101027574 A 8/2007
CN 101907713 A 12/2010
(Continued)

OTHER PUBLICATIONS

International Search Report and Written Opinion—PCT/US2016/052244—ISA/EPO—dated Nov. 17, 2016.
(Continued)

*Primary Examiner* — Luke D Ratcliffe
(74) *Attorney, Agent, or Firm* — QUALCOMM Incorporated

(57) ABSTRACT

Aspects of the disclosure are related to a Lidar device, comprising: a vibrating fiber optic cantilever system on a transmit (TX) path; and a two-dimensional (2D) light sensor array on a receive (RX) path.

30 Claims, 4 Drawing Sheets

Related U.S. Application Data

(60) Provisional application No. 62/220,777, filed on Sep. 18, 2015.

(51) Int. Cl.
*G01S 17/06* (2006.01)
*G01S 17/42* (2006.01)

(56) References Cited

U.S. PATENT DOCUMENTS

| | | | |
|---|---|---|---|
| 6,301,033 | B1 | 10/2001 | Kazawa |
| 6,341,118 | B1* | 1/2002 | Drobot ................ G11B 7/124 369/44.37 |
| 6,433,543 | B1 | 8/2002 | Shahinpoor et al. |
| 7,064,817 | B1 | 6/2006 | Schmitt et al. |
| 8,310,655 | B2 | 11/2012 | Mimeault |
| 8,797,512 | B2 | 8/2014 | Stettner et al. |
| 8,826,188 | B2 | 9/2014 | Sheynblat et al. |
| 8,946,637 | B2 | 2/2015 | Chinn et al. |
| 9,069,061 | B1 | 6/2015 | Harwit |
| 10,408,926 | B2 | 9/2019 | Slobodyanyuk et al. |
| 2002/0139920 | A1 | 10/2002 | Seibel et al. |
| 2005/0018264 | A1* | 1/2005 | Benedict ................ G02B 26/10 359/209.1 |
| 2005/0121615 | A1 | 6/2005 | Prater et al. |
| 2007/0081168 | A1* | 4/2007 | Johnston .............. A61B 5/1076 600/117 |
| 2009/0028407 | A1* | 1/2009 | Seibel .................. A61B 1/0627 382/131 |
| 2013/0300840 | A1 | 11/2013 | Borowski |
| 2014/0085622 | A1 | 3/2014 | Wong |
| 2016/0047903 | A1* | 2/2016 | Dussan ................... G01S 17/89 356/5.01 |
| 2018/0275276 | A1* | 9/2018 | Ngal ....................... G01S 17/42 |

FOREIGN PATENT DOCUMENTS

| | | |
|---|---|---|
| CN | 102525384 A | 7/2012 |
| CN | 103412313 A | 11/2013 |
| CN | 103502839 A | 1/2014 |
| CN | 203385859 U | 1/2014 |
| CN | 103744087 A | 4/2014 |
| CN | 104720815 A | 6/2015 |
| DE | 202013101039 U1 | 3/2014 |
| EP | 2442136 A1 | 4/2012 |
| JP | 2000056018 A | 2/2000 |
| JP | 2002039716 A | 2/2002 |
| JP | 2005501279 A | 1/2005 |
| JP | 2009070157 A | 4/2009 |
| KR | 20040047791 A | 6/2004 |
| KR | 20140112069 A | 9/2014 |
| WO | 03019661 A1 | 3/2003 |
| WO | 2007024221 A1 | 3/2007 |
| WO | 2009014525 A1 | 1/2009 |
| WO | 2012123809 A1 | 9/2012 |
| WO | 2013032635 A1 | 3/2013 |

OTHER PUBLICATIONS

Second Written Opinion from International Application No. PCT/US2016/052244, dated Sep. 21, 2017, 7 Pages.
Chamberlain, N., et al., "The DESDynl Synthetic Aperture Radar Array-Fed Reflector Antenna", IEEE International Symposium on Phased Array Systems and Technology, Oct. 28, 2010, pp. 381-386.
Du, L., "A Method to Select Receiving Channels for the Multi-Spectral Earth Observation LiDAR", Acta Optica Sinica, vol. 34, No. 8, Aug. 31, 2014, pp. 1-8.

* cited by examiner

IMPLEMENTATION OF THE FOCAL PLANE 2D APD ARRAY FOR HYPERION LIDAR SYSTEM

CROSS-REFERNCE TO RELATED-APPLICATIONS

This present application is a continuation of U.S. Application Ser. No. 15/266,618, filed Sep. 15, 2016, which claims the benefit of U.S. Provisional Application No. 62/220,777 entitled "IMPLEMENTATION OF THE FOCAL PLANE 2D APD ARRAY FOR HYPERION LIDAR SYSTEM," filed Sep. 18, 2015, the entire contents of which are herein incorporated by reference in their entireties for all purposes.

FIELD

The subject matter disclosed herein relates to electronic devices, and more particularly to methods, apparatuses, and systems for measuring the distance to an object using light.

BACKGROUNDS

A Lidar (also LIDAR, LiDAR, or LADAR, portmanteau of "light" and "radar") is a remote sensing technology that measures distance by illuminating a target with a laser and analyzing the reflected light. The ability to accurately range the distance to the objects in the immediate environment is important for many mobile applications, such as indoor mapping and navigation, enhanced photography, or computer vision, etc.

The ability to quickly produce highly accurate 3D scans of objects will be an important feature for mobile devices.

Known methods suffer from multiple disadvantages—a limited range, low accuracy, indoor operation limitations, etc. In many instances conventional solutions cannot be accommodated by the mobile devices' small form factor.

SUMMARY

One aspect of the disclosure is related to a Lidar device, comprising: a vibrating fiber optic cantilever system on a transmit (TX) path; and a two-dimensional (2D) light sensor array on a receive (RX) path.

A method for implementing a Lidar device, comprising: implementing a vibrating fiber optic cantilever system on a transmit (TX) path; and implementing a two-dimensional (2D) light sensor array on a receive (RX) path.

A Lidar device, comprising: a vibrating fiber optic cantilever means on a transmit (TX) path; and a two-dimensional (2D) light sensing means on a receive (RX) path.

A non-transitory computer-readable medium comprising code which, when executed by a processor, causes the processor to implement a method comprising: driving a vibrating fiber optic cantilever system on a transmit (TX) path of a Lidar device; and driving a two-dimensional (2D) light sensor array on a receive (RX) path of the Lidar device.

DETAILED DESCRIPTION

Embodiments of the disclosure are related to apparatuses, systems, and methods for measuring distance by illuminating a target with a laser and analyzing the reflected light.

Figure 1:
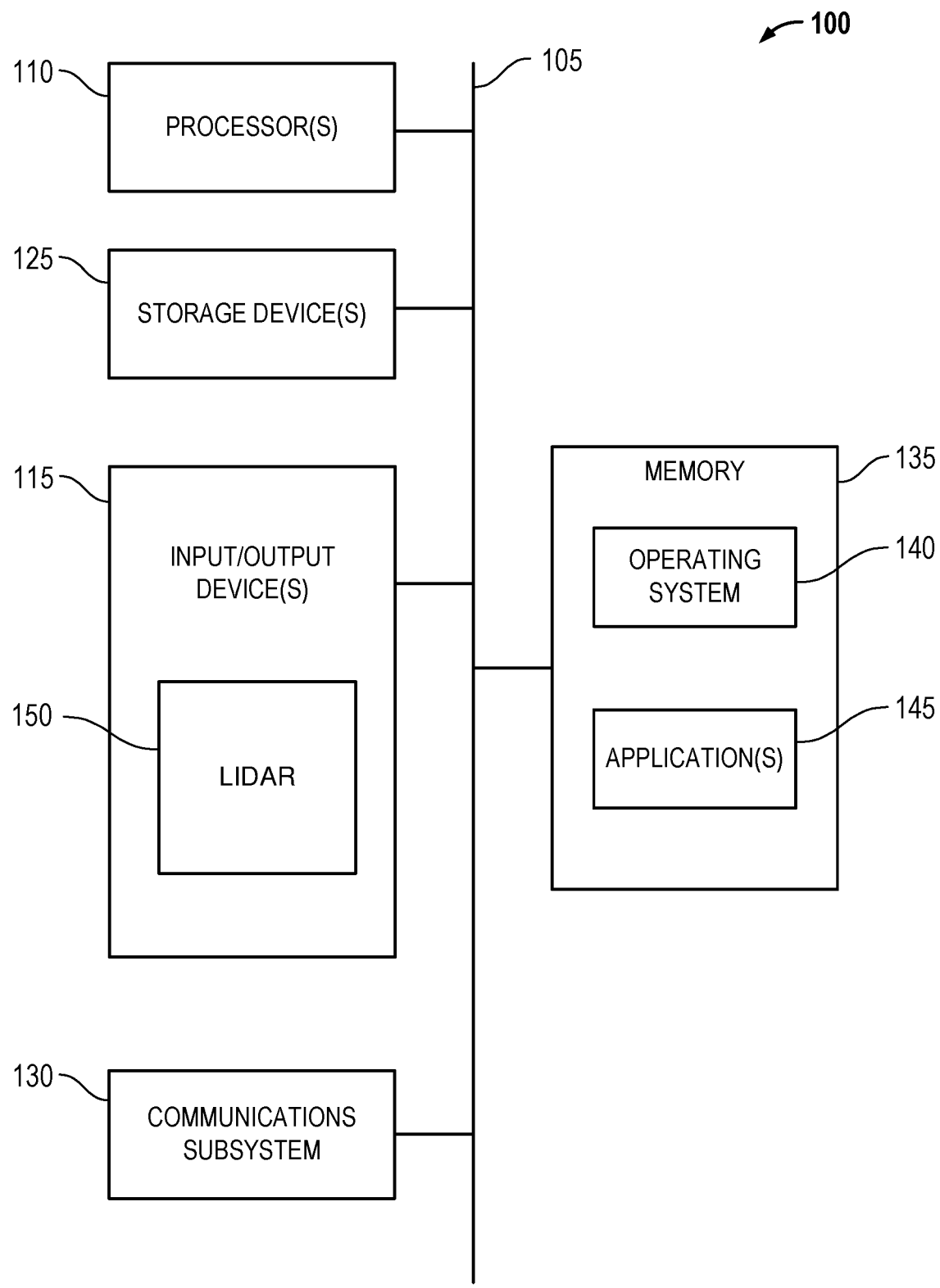
FIG. 1 is diagram illustrating an example device with which embodiments of the disclosure may be practiced.

Referring to FIG. 1, an example device 100 adapted for use with a Lidar is shown. The device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input/output devices 115 including without limitation a Lidar 150, a mouse, a keyboard, a speaker, a printer, and/or the like. The Lidar 150 may include a hardware Lidar controller.

The device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The device 100 might also include a communication subsystem 130, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 130 may permit data to be exchanged with a network, other computer systems/devices, and/or any other devices described herein. In many embodiments, the device 100 will further comprise a working memory 135, which can include a RAM or ROM device, as described above.

The device 100 also can comprise software elements, shown as being currently located within the working memory 135, including an operating system 140, device drivers, executable libraries, and/or other code, such as one or more application programs 145, which may comprise or may be designed to implement methods, and/or configure systems, provided by other embodiments, as described herein. Merely by way of example, one or more procedures described with respect to the method(s) discussed below might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a computer device, such as the device 100. In other embodiments, the storage medium might be separate from a computer device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized device 100 and/or might take the form of source and/or installable code, which, upon compilation and/or installation on the device 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

A Lidar, such as Lidar 150, may consist of two subsystems—a beam steering element and a range finder. The beam steering element may steer the projected laser beam to create a scanning pattern. And the range finder may convert the reflected light from the object being scanned into information about the distance to different parts of the object based on such measurements and/or techniques as pulsed Time of Flight, phase shift Time of Flight, or coherent detection, etc. In one embodiment, both the beam steering element and the range finder subsystems may be implemented with a very small form factor.

Therefore, a Lidar may include two light paths—a transmit (TX) path through which laser travels from the laser source to the object (target) being scanned, and a receive (RX) path through which the reflected light travels from the target to the light receiving element of the range finder.

In one embodiment, on the TX path, the scanning laser may be emitted from a fiber optic cable, such as a single mode or multimode fiber optic cable, and through a series of TX optics. The laser from the range finder subsystem may be coupled into the fiber optic cable.

Figure 2:
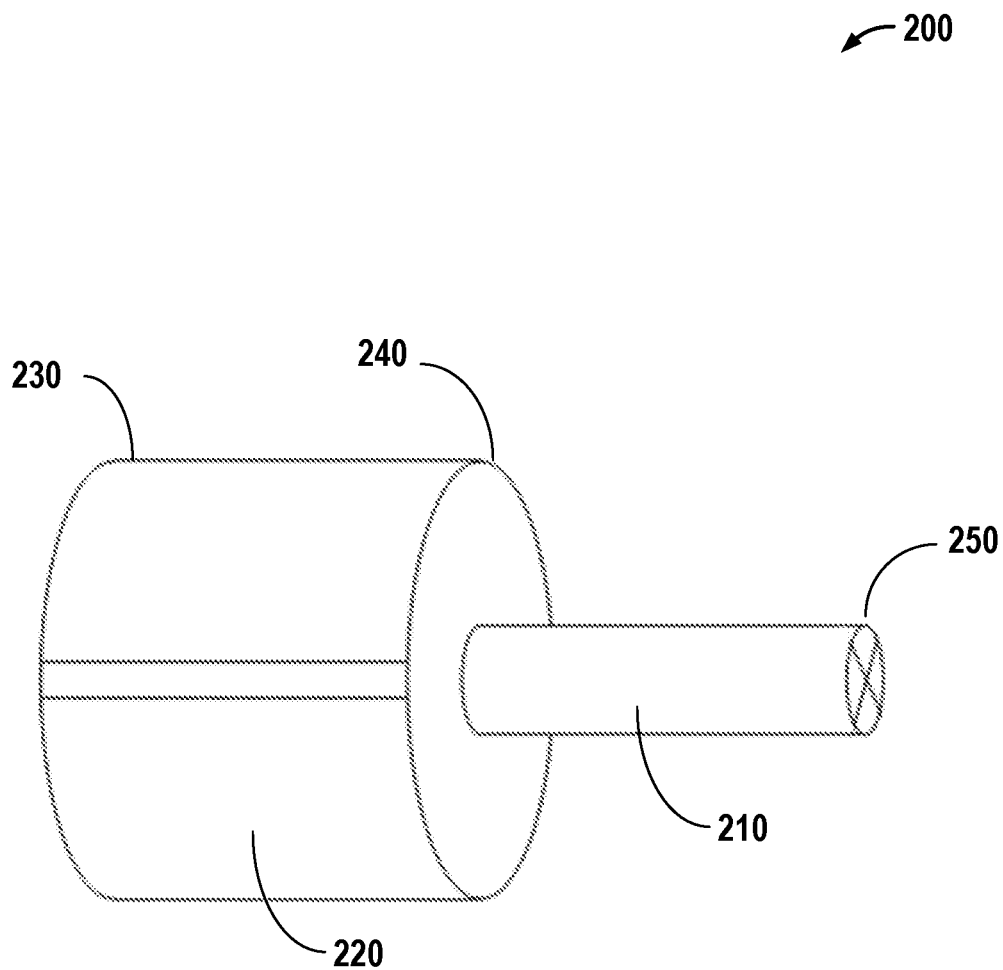
FIG. 2 is a diagram illustrating an example vibrating fiber optic cantilever system.

Referring to FIG. 2, a diagram illustrating an example vibrating fiber optic cantilever system 200 is shown. The fiber optic cable 210 may be threaded through a piezo ceramic tube 220. The piezo ceramic tube 220 may be fixed to the body of a device, such as device 100, at one end 230, and free at the other end 240. The fiber optic cable 210 may be fixed to the free end 240 of the piezo ceramic tube 220, while the free end 250 of the fiber optic cable 210 may be extended further from the free end 240 of the piezo ceramic tube 220 by a predetermined length. As such, a fixed-free vibrating cantilever system 200 may be created. A skilled artisan would recognize that the length of the free fiber optic cable extension outside the piezo ceramic tube 220 and other physical properties of the fiber optic cable 210 may determine the resonant frequency of the cantilever.

By applying suitable driving signals, the piezo ceramic tube 220 may be driven to vibrate at a desired frequency. When the piezo ceramic tube 220 is driven to vibrate at the resonant frequency of the cantilever, the cantilever may be excited in the resonance mode. In other words, small vibrations at the base of the cantilever may be amplified and the tip (e.g., free end 250) of the fiber optic cable 210 may vibrate with a large amplitude. Moreover, the motion of the tip (e.g., free end 250) of the fiber optic cable 210 may be controlled with suitable driving signals applied to the piezo ceramic tube 220. Therefore, a desired scanning pattern may be implemented.

Simple TX optics, such as a simple lens assembly, may be used to collect the laser exiting from the tip (e.g., free end 250) of the fiber optic cable 210 and condition it for projection.

On the RX path, reflected light may be collected by means of an omnidirectional lens or lens assembly onto a light sensor. Therefore, the distance to the object being scanned may be determined based on the signal generated by the light sensor, while the direction of the object may be determined based on the position of the tip (e.g., free end 250) of the fiber optic cable 210.

Thus, the Lidar may generate a points cloud comprising highly accurate 3D coordinates of the parts of the target scanned. 3D maps of the environment, or 3D scans of objects, may be generated based on the Lidar points cloud.

Collecting reflected light from the object being scanned with a wide field of view (FOV) lens onto a single light sensor may have certain disadvantages. Because the lens has a wide FOV, background interference, such as sunlight radiation, or a car's high beam light, etc., may be collected onto the light sensor. As a result, the range of the Lidar may be adversely affected.

As an alternative to the wide FOV lens on the RX path, the reflected light may be coupled back into the cantilever so that the active FOV may be reduced. However, since coupling efficiency could be limited, the reduction in background interference may be accompanied by a reduction in useful signals. Moreover, significant leakage of the laser pulse on the TX path into the RX path may desensitize electronics on the RX path and therefore degrade the performance of the Lidar.

Figure 3:
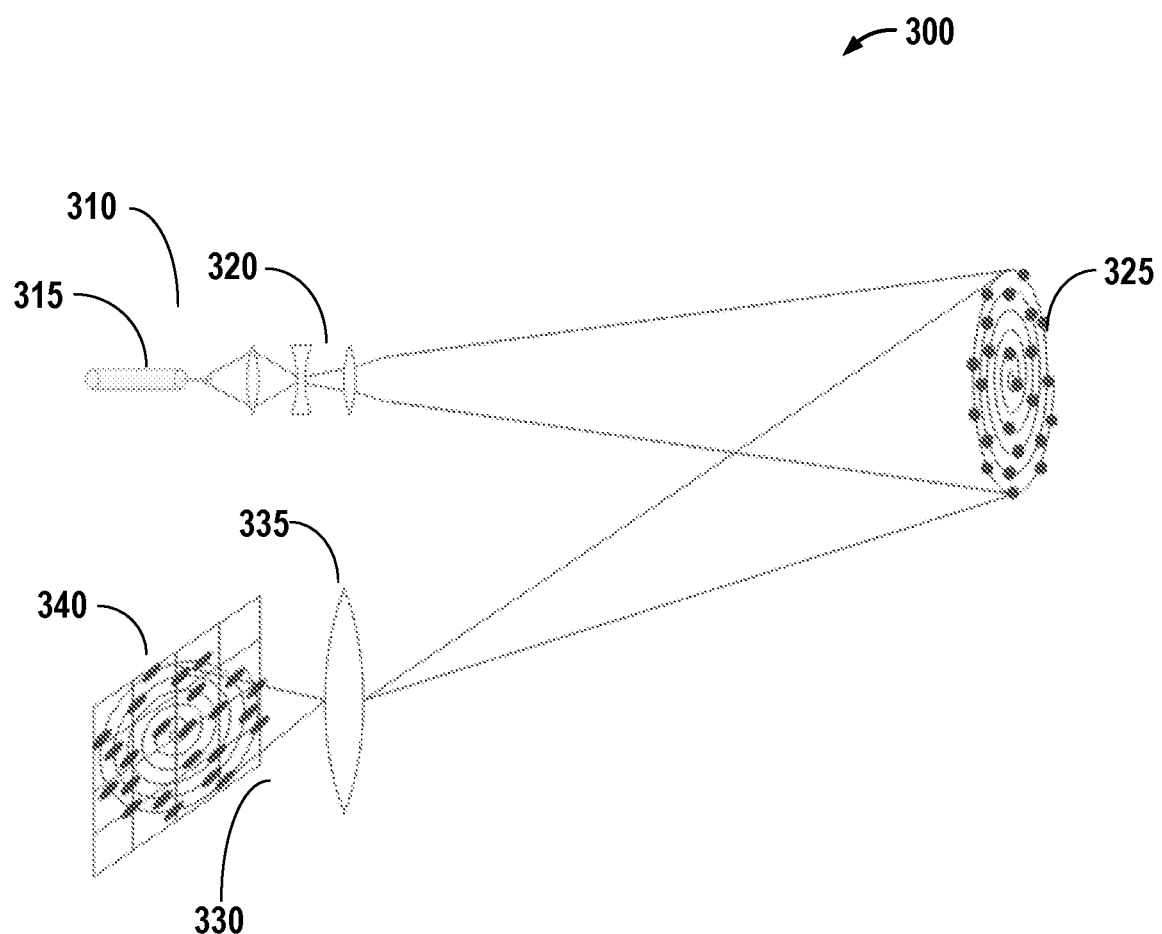
FIG. 3 is a diagram illustrating an example Lidar including both the TX and RX paths.

Referring to FIG. 3, a diagram illustrating an example Lidar 300 including both the TX and RX paths is shown. On the TX path 310, a vibrating fiber optic cantilever 315 may be utilized to project the scanning laser onto the target through TX optics 320. In one embodiment, with suitable driving signals, the free end of the fiber optic cable may travel along a spiral pattern. The scanning pattern used does not limit the disclosure and other scanning patterns may also be utilized. The laser emitting element may fire laser pulses at intervals. Each dot 325 in FIG. 3 may correspond to a single laser pulse. On the RX path 330, the reflected light as well as interferences is collected by the RX optics 335 onto a two-dimensional (2D) light sensor array 340 comprising a plurality of light sensors. In other words, the 2D light sensor array 340 may be situated at the focal plane of the RX optics 335. The type of the light sensors used does not limit the disclosure. For example, the 2D light sensor array 340 may comprise avalanche photodiodes (APDs) or PIN photodiodes as light sensors. Shown in FIG. 3 is a 4×4 2D light sensor array; however, the configuration of the 2D light sensor array does not limit the disclosure. Further, it should be appreciated that although only a single lens is shown for the RX optics 335 in FIG. 3, more complex RX optics may also be utilized.

As the FOV of each individual light sensor in the 2D light sensor array 340 is only a fraction of the combined FOV of the whole system, the background interference collected onto each light sensor is proportionally reduced, while the reflected light useful to the Lidar is not attenuated. Therefore, the signal-to-noise ratio (SNR) value of the Lidar may be improved, increasing the range and improving the accuracy of the measurements. Moreover, the Lidar may perform more robustly in the presence of interference.

In one embodiment described above, a pulsed Time of Flight (ToF) method may be utilized to measure the distance to the object being scanned. To use the method, the time when the reflected light is registered by the specific one or more light sensors in the 2D light sensor array 340 with respect to the time when the corresponding laser pulse was projected into the environment needs to be measured. In different embodiments, the measurement may be performed using Time-to-Digital Converters (TDCs), or Analog-to-Digital Converters (ADCs).

With a TDC, a set of predefined threshold values may be used to trigger the start and the stop of the counters, so when the voltage from a light sensor exceeds a certain value, a counter may be activated. The TDC has a simple architecture and is easy to implement. However, as the TDC is capable of capturing only the timing information, other data useful for the Lidar, such as the power of the reflected light, may not be captured accurately, or may be lost. Also, the TDC may not be able to correctly represent the data available in the light sensor signal when multiple objects, e.g., tree branches, rain droplets, etc., are present in the light path.

On the other hand, the ADC may be better able to extract data from the light sensor signal in a comprehensive and accurate manner. For use with a Lidar, high performance ADCs—e.g., ADCs running at approximately 10 GHz—may be required. In some embodiments, the ADC performance requirement may be relaxed with a smaller ADC word size (e.g., 8 bits).

The signals from the 2D light sensor array may be processed with either a parallel architecture or a serial architecture. With the parallel architecture, each light sensor in the 2D light sensor array is provided with and connected to a dedicated time measuring converter (either a TDC or an ADC). Thus, the outputs of all the light sensors in the 2D light sensor array may be processed at once by the time measuring converters.

In one embodiment, since the direction in which each laser pulse firing is sent is known as a result of the TX path architecture, the one or more particular light sensors in the 2D light sensor array that will receive the corresponding reflected light are also known. With such an architecture, the accuracy of the Lidar measurements is defined by the scanning resolution on the TX path, while the RX path architecture enhances the SNR of the measurements. In other words, only the timing information is unknown and needs to be measured, because outputs from light sensors in the 2D light sensor array that will not receive the reflected light do not contain useful information.

Figure 4:
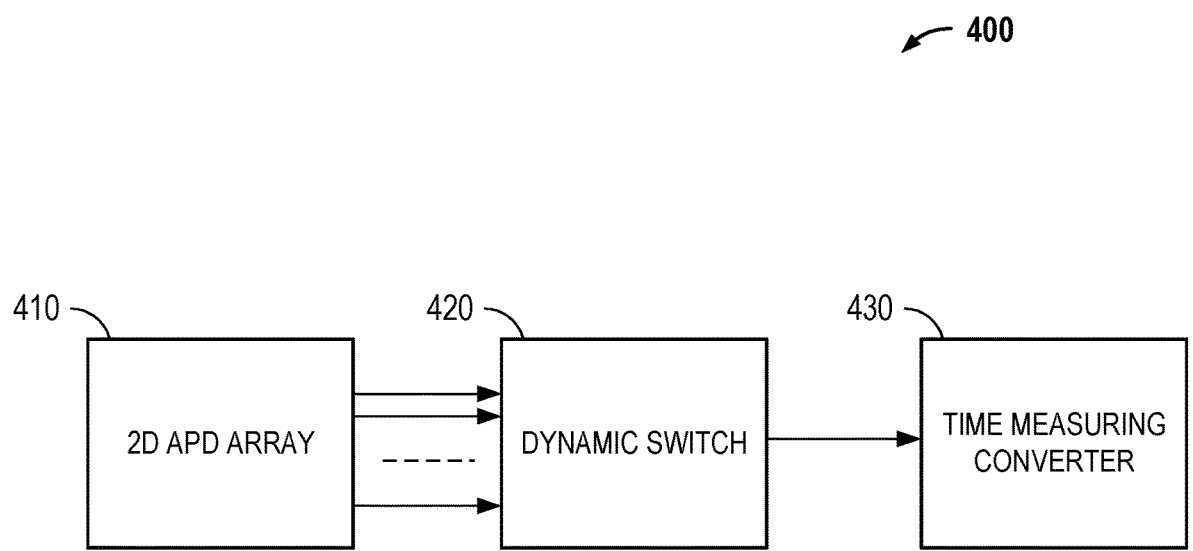
FIG. 4 is a diagram illustrating an example serial architecture for extracting data from a 2D light sensor array.

Referring to FIG. 4, a diagram illustrating an example serial architecture 400 for extracting data from a 2D light sensor array is shown. All the outputs from the individual light sensors in the 2D light sensor array 410 may be routed through a dynamic switch 420. Based on the direction of the projected laser pulse, which may be obtained from the TX path, the dynamic switch 420 may route the output from the one or more particular light sensors that are expected to receive the reflected light onto the time measuring converter(s) 430. Depending on different implementations, the number of the time measuring converter(s) 430 may vary. In one embodiment, a single time measuring converter 430 may be used. The number of the time measuring converter(s) 430 limits the number of light sensors from which signals are processed for each laser pulse firing. After each new laser pulse firing on the TX path, the dynamic switch 420 may correspondingly route the outputs from a new particular set of one or more light sensors to the time measuring converter(s) 430. Therefore, with the use of the dynamic switch 420, fewer time measuring converters 430 than the number of light sensors may be required. In one embodiment, only a single time measuring converter 430 is required and used.

The 2D light sensor array may also be utilized to assist in a calibration/re-calibration process of the TX path. When the reflected light is not received by the expected one or more light sensors in the 2D light sensor array, the TX path may not be projecting laser pulses in the right direction. By correlating the apparent projection directions with the light sensors that receive the reflected light, a calibration/re-calibration process for the TX path may be performed, and tuning parameters updated.

Therefore, embodiments of the disclosure are related to a Lidar comprising a vibrating fiber optic cantilever system on the TX path and a 2D light sensor array on the RX path. The vibrating fiber optic cantilever system may further comprise a piezo ceramic tube and a fiber optic cable. The free end of the fiber optic cable may be extended outside the free end of the piezo ceramic tube by a predetermined length. The piezo ceramic tube may be driven by a suitable signal to vibrate at the resonant frequency of the cantilever system such that the vibration is amplified at the free end of the fiber optic cable. The motion of the free end of the fiber optic cable may follow a predetermined scanning pattern, and a laser emitting element may emit laser pulses at intervals. The laser pulses may exit from the free end of the fiber optic cable and be projected by TX optics onto the target being scanned. The light reflected off the target being scanned may be collected by RX optics onto the 2D light sensor array. Based on the direction in which a laser pulse is projected, a dynamic switch may route the output from one or more particular light sensors in the 2D light sensor array that are expected to receive the reflected light to one or more time measuring converters, wherein the time measuring converters may be either TDCs or ADCs. In one embodiment, only one time measuring converter may be used.

The Lidar may process the data captured by the time measuring converters and generate a points cloud, based on which accurate 3D maps of the environment, or 3D scans of the object, may be constructed. Therefore, the accuracy of the Lidar measurements is defined by the scanning resolution on the TX path, while the RX path architecture enhances the SNR of the measurements. The Lidar, according to the embodiments of the disclosure, may have a longer range and better signal accuracy, and may perform more robustly where interference may be present.

Another embodiment of the disclosure is related to a method for implementing a Lidar device, comprising: implementing a vibrating fiber optic cantilever system on a transmit (TX) path; and implementing a two-dimensional (2D) light sensor array on a receive (RX) path.

Yet another embodiment of the disclosure is related to a non-transitory computer-readable medium comprising code which, when executed by a processor, causes the processor to implement a method comprising: driving a vibrating fiber optic cantilever system on a transmit (TX) path of a Lidar device; and driving a two-dimensional (2D) light sensor array on a receive (RX) path of the Lidar device.

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, wearable devices, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A Lidar device, comprising:
   a vibrating fiber optic cantilever system on a transmit (TX) path that emits laser pulses onto a target, wherein a free end of the fiber optic cantilever system is configured to travel along a spiral pattern;

a two-dimensional (2D) light sensor array on a receive (RX) path that receives light reflected off the target and collected by an omnidirectional lens or lens assembly, wherein the 2D light sensor array includes a plurality of light sensors, wherein each light sensor in the plurality of light sensors is configured to receive a fraction of a field of view (FOV); and a dynamic switch, wherein based on a direction in which a laser pulse is projected by the vibrating fiber optic cantilever system on the TX path, the dynamic switch routes outputs from one or more light sensors in the 2D light sensor array that are expected to receive the reflected light to one or more time measuring converters.

2. The Lidar device of claim 1, wherein the vibrating fiber optic cantilever system further comprises a piezo ceramic tube and a fiber optic cable, and a free end of the fiber optic cable extends outside a free end of the piezo ceramic tube by a predetermined length, and wherein the piezo ceramic tube is driven by a signal to vibrate at a resonant frequency of the vibrating fiber optic cantilever system such that the vibration is amplified at the free end of the fiber optic cable.

3. The Lidar device of claim 2, wherein a motion of the free end of the fiber optic cable follows a predetermined scanning pattern.

4. The Lidar device of claim 3, further comprising a laser emitting element that emits the laser pulses at intervals.

5. The Lidar device of claim 4, further comprising TX optics, wherein the laser pulse exits from the free end of the fiber optic cable and is projected through the TX optics and onto the target.

6. The Lidar device of claim 5, further comprising RX optics, wherein the light reflected off the target is collected by the RX optics onto the 2D light sensor array.

7. The Lidar device of claim 6, further comprising the one or more time measuring converters.

8. The Lidar device of claim 1, wherein the time measuring converters are either Time-to-Digital Converters (TDCs) or Analog-to-Digital Converters (ADCs).

9. The Lidar device of claim 1, wherein the 2D light sensor array comprises avalanche photodiodes (APDs) or PIN photodiodes.

10. A method for implementing a Lidar device, comprising:

implementing a vibrating fiber optic cantilever system on a transmit (TX) path that emits laser pulses onto a target, wherein a free end of the fiber optic cantilever system travels along a spiral pattern;

implementing a two-dimensional (2D) light sensor array on a receive (RX) path that receives light reflected off the target, wherein the 2D light sensor array includes a plurality of light sensors, wherein each light sensor in the plurality of light sensors is configured to receive a fraction of a field of view (FOV); and implementing a dynamic switch, wherein based on a direction in which a laser pulse is projected by the vibrating fiber optic cantilever system on the TX path, the dynamic switch routes outputs from one or more light sensors in the 2D light sensor array that are expected to receive the reflected light to one or more time measuring converters.

11. The method of claim 10, wherein the vibrating fiber optic cantilever system further comprises a piezo ceramic tube and a fiber optic cable, and a free end of the fiber optic cable extends outside a free end of the piezo ceramic tube by a predetermined length, and wherein the piezo ceramic tube is driven by a signal to vibrate at a resonant frequency of the vibrating fiber optic cantilever system such that the vibration is amplified at the free end of the fiber optic cable.

12. The method of claim 11, wherein a motion of the free end of the fiber optic cable follows a predetermined scanning pattern.

13. The method of claim 12, further comprising implementing a laser emitting element that emits the laser pulses at intervals.

14. The method of claim 13, further comprising implementing TX optics, wherein the laser pulse exits from the free end of the fiber optic cable and is projected through the TX optics and onto the target.

15. The method of claim 14, further comprising implementing RX optics, wherein the light reflected off the target is collected by the RX optics onto the 2D light sensor array.

16. The method of claim 15, further comprising implementing one or more time measuring converters.

17. The method of claim 10, wherein the time measuring converters are either Time-to-Digital Converters (TDCs) or Analog-to-Digital Converters (ADCs).

18. The method of claim 10, wherein the 2D light sensor array comprises avalanche photodiodes (APDs) or PIN photodiodes.

19. A Lidar device, comprising:

a vibrating fiber optic cantilever means on a transmit (TX) path that emits laser pulses onto a target, wherein a free end of the fiber optic cantilever system is configured to travel along a spiral pattern;

a two-dimensional (2D) light sensing means on a receive (RX) path that receives light reflected off the target, wherein the 2D light sensor array includes a plurality of light sensors, wherein each light sensor in the plurality of light sensors is configured to receive a fraction of a field of view (FOV); and a dynamic switch means, wherein based on a direction in which a laser pulse is projected by the vibrating fiber optic cantilever means on the TX path, the dynamic switch means routes outputs from one or more light sensors in the 2D light sensor array that are expected to receive the reflected light to one or more time measuring converters.

20. The Lidar device of claim 19, wherein the vibrating fiber optic cantilever means further comprises a piezo ceramic tube and a fiber optic cable, and a free end of the fiber optic cable extends outside a free end of the piezo ceramic tube by a predetermined length, and wherein the piezo ceramic tube is driven by a signal to vibrate at a resonant frequency of the vibrating fiber optic cantilever means such that the vibration is amplified at the free end of the fiber optic cable.

21. The Lidar device of claim 20, wherein a motion of the free end of the fiber optic cable follows a predetermined scanning pattern.

22. The Lidar device of claim 21, further comprising a laser emitting means that emits the laser pulses at intervals.

23. The Lidar device of claim 22, further comprising TX optics, wherein the laser pulse exits from the free end of the fiber optic cable and is projected through the TX optics and onto the target.

24. The Lidar device of claim 23, further comprising RX optics means, wherein the light reflected off the target is collected by the RX optics onto the 2D light sensor array.

25. A non-transitory computer-readable medium comprising code which, when executed by a processor, causes the processor to implement a method comprising:

driving a vibrating fiber optic cantilever system on a transmit (TX) path of a Lidar device that emits laser pulses onto a target, wherein a free end of the fiber optic cantilever system is configured to travel along a spiral pattern;

driving a two-dimensional (2D) light sensor array on a receive (RX) path of the Lidar device that receives light reflected off the target, wherein the 2D light sensor array includes a plurality of light sensors, wherein each light sensor in the plurality of light sensors is configured to receive a fraction of a field of view (FOV); and driving a dynamic switch, wherein based on a direction in which a laser pulse is projected by the vibrating fiber optic cantilever system on the TX path, the dynamic switch routes outputs from one or more light sensors in the 2D light sensor array that are expected to receive the reflected light to one or more time measuring converters.

26. The non-transitory computer-readable medium of claim 25, wherein the vibrating fiber optic cantilever system further comprises a piezo ceramic tube and a fiber optic cable, and a free end of the fiber optic cable extends outside a free end of the piezo ceramic tube by a predetermined length, and wherein the piezo ceramic tube is driven by a signal to vibrate at a resonant frequency of the vibrating fiber optic cantilever system such that the vibration is amplified at the free end of the fiber optic cable.

27. The non-transitory computer-readable medium of claim 26, wherein a motion of the free end of the fiber optic cable follows a predetermined scanning pattern.

28. The non-transitory computer-readable medium of claim 27, further comprising code for driving a laser emitting element that emits the laser pulses at intervals.

29. The non-transitory computer-readable medium of claim 28, further comprising code for driving TX optics, wherein the laser pulse exits from the free end of the fiber optic cable and is projected through the TX optics and onto the target.

30. The non-transitory computer-readable medium of claim 29, further comprising code for driving RX optics, wherein the light reflected off the target is collected by the RX optics onto the 2D light sensor array.

* * * * *